United States Patent
Koo et al.

(10) Patent No.: US 11,474,726 B2
(45) Date of Patent: Oct. 18, 2022

(54) MEMORY SYSTEM, MEMORY CONTROLLER, AND OPERATION METHOD THEREOF

(71) Applicant: SK hynix Inc., Gyeonggi-do (KR)

(72) Inventors: Duck Hoi Koo, Gyeonggi-do (KR); In Ho Jung, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 33 days.

(21) Appl. No.: 16/988,111

(22) Filed: Aug. 7, 2020

(65) Prior Publication Data

US 2021/0064260 A1 Mar. 4, 2021

(30) Foreign Application Priority Data

Sep. 4, 2019 (KR) .................. 10-2019-0109243

(51) Int. Cl.
*G06F 12/00* (2006.01)
*G06F 3/06* (2006.01)

(52) U.S. Cl.
CPC .......... *G06F 3/0644* (2013.01); *G06F 3/0604* (2013.01); *G06F 3/064* (2013.01); *G06F 3/0673* (2013.01)

(58) Field of Classification Search
CPC ...... G06F 3/0644; G06F 3/0604; G06F 3/064; G06F 3/0673; G06F 2212/7202; G06F 2212/7207; G06F 3/0611; G06F 12/0246; G06F 3/0679; G06F 3/0658; G06F 3/0661

See application file for complete search history.

(56) References Cited

U.S. PATENT DOCUMENTS

| | | | |
|---|---|---|---|
| 2015/0121003 A1* | 4/2015 | Rosenband | G06F 3/0605 711/114 |
| 2017/0031751 A1* | 2/2017 | Baek | G06F 3/0619 |
| 2018/0357159 A1* | 12/2018 | Parker | G06F 3/0688 |
| 2019/0042150 A1* | 2/2019 | Wells | G06F 3/0679 |
| 2019/0362081 A1* | 11/2019 | Kanno | G06F 3/0688 |
| 2020/0285393 A1* | 9/2020 | Lin | G06F 3/064 |
| 2020/0409856 A1* | 12/2020 | Navon | G06F 12/0246 |

FOREIGN PATENT DOCUMENTS

| | | |
|---|---|---|
| KR | 10-2019-0105414 | 9/2019 |
| KR | 10-2020-0032404 | 3/2020 |

\* cited by examiner

*Primary Examiner* — Jason W Blust
(74) *Attorney, Agent, or Firm* — IP & T Group LLP

(57) ABSTRACT

Embodiments of the present disclosure relate to a memory system, a memory controller, and an operation method thereof, in which a data storage space of a memory device is divided into N namespaces, and in which each namespace is controlled so as to share a super memory block with other namespaces or to occupy the same exclusively, thereby minimizing an increase in the time taken to format each of a plurality of namespaces while efficiently storing data in a plurality of namespaces.

14 Claims, 15 Drawing Sheets

MEMORY SYSTEM, MEMORY CONTROLLER, AND OPERATION METHOD THEREOF

CROSS REFERENCE TO RELATED APPLICATION

The present application claims priority under 35 U.S.C. 119(a) to Korean patent application number 10-2019-0109243, filed on Sep. 4, 2019, which is incorporated herein by reference in its entirety.

BACKGROUND

1. Field of the Invention

Embodiments of the present disclosure relate to a memory system, a memory controller, and an operation method thereof.

2. Description of the Prior Art

A memory system, e.g., a storage device, stores data on the basis of a request from a host, such as a computer, a mobile terminal (for example, a smartphone or a tablet), or any of various other electronic devices. The memory system may be a type of device that stores data in a magnetic disk such as a hard disk drive (HDD), or a type of device that stores data in a nonvolatile memory such as a solid state drive (SSD), a universal flash storage device (UFS), or an embedded MMC (eMMC) device.

The memory system may further include a memory controller for controlling the memory device. The memory controller may receive a command input from the host and on the basis of the received command, may execute or control operations for reading, writing, or erasing data in a volatile memory or a nonvolatile memory included in the memory system. The memory controller may drive firmware for performing a logical operation for executing or controlling such operations.

Meanwhile, the trend toward increased storage capacity of memory systems is on the rise. Thus, there is increasing need for a memory system to support namespace functions capable of providing a plurality of logical areas in order for a host to efficiently use the memory system.

SUMMARY

Embodiments of the present disclosure may provide a memory system, a memory controller, and an operation method thereof capable of efficiently storing data in a plurality of namespaces.

In addition, embodiments of the present disclosure may provide a memory system, a memory controller, and an operation method thereof capable of minimizing an increase in the time taken for formatting each of a plurality of namespaces.

In an aspect, embodiments of the present disclosure may provide a memory system including a memory device including a plurality of memory blocks and a memory controller configured to control the memory device.

The memory controller may divide a data storage space of the memory device into N namespaces, where N is a natural number of 2 or more.

The memory controller may perform control such that a first namespace of the N namespaces shares a super memory block, which includes some of the plurality of memory blocks, with a second namespace different from the first namespace, among the N namespaces, or exclusively occupies the super memory block based on a sharing level of the first namespace.

In this case, The memory controller may perform control such that a first namespace shares a super memory block, which includes some of the plurality of memory blocks, with a second namespace different from the first namespace, among the N namespaces, or exclusively occupies the super memory block independently on the basis of a sharing level of the first namespace.

The sharing level of the first namespace may be set according to the ratio of the size of the first namespace to the total size of the data storage space of the memory device.

The sharing level of the first namespace may be set according to the size of the first namespace and one or more pieces of threshold size information.

The memory controller may be configured to, when the sharing level of the first namespace is a first sharing level, perform control such that the first namespace exclusively occupies the super memory block.

The memory controller may be configured to, when the sharing level of the first namespace is a second sharing level different from the first sharing level, perform control such that the first namespace shares the super memory block with the second namespace. In this case, the sharing level of the second namespace may be the second sharing level.

The memory controller may be configured to set a maximum number of namespaces capable of sharing the super memory block depending on the second sharing level.

The memory controller may be configured to, when the sharing level of the first namespace is a second sharing level different from the first sharing level, and when there is no other namespace having the second sharing level, perform control such that the first namespace exclusively occupies the super memory block.

In another aspect, embodiments of the present disclosure may provide a memory controller including a memory interface configured to communicate with a memory device including a plurality of memory blocks and a control circuit configured to control the memory device.

The control circuit may be configured to divide a data storage space of the memory device into N namespaces, where N is a natural number of 2 or more.

The control circuit may be configured to perform control such that a first namespace of the N namespaces shares a super memory block, which includes some of the plurality of memory blocks, with a second namespace different from the first namespace, among the N namespaces, or exclusively occupies the super memory block based on a sharing level of the first namespace.

In this case, the control circuit may be configured to perform control such that a first namespace shares a super memory block, which includes some of the plurality of memory blocks, with a second namespace different from the first namespace, among the N namespaces, or exclusively occupies the super memory block independently on the basis of a sharing level of the first namespace.

The control circuit may be configured to, when the sharing level of the first namespace is a first sharing level, perform control such that the first namespace independently occupies the super memory block.

The control circuit may be configured to, when the sharing level of the first namespace is a second sharing level different from the first sharing level, perform control such that the first namespace shares the super memory block with the second namespace. In this case, the sharing level of the second namespace may be the second sharing level.

The control circuit may be configured to set the maximum number of namespaces capable of sharing the super memory block depending on the second sharing level.

The control circuit may be configured to, when the sharing level of the first namespace is a second sharing level different from the first sharing level, and when there is no other namespace having the second sharing level, perform control such that the first namespace independently occupies the super memory block.

In another aspect, embodiments of the present disclosure may provide an operation method of a memory controller for controlling a memory device including a plurality of memory blocks.

The operation method of a memory controller may include dividing a data storage space of the memory device into N namespaces, where N is a natural number of 2 or more.

The operation method of a memory controller may include performing control such that a first namespace of the N namespaces shares a super memory block, which includes some of the plurality of memory blocks, with a second namespace different from the first namespace, among the N namespaces, or exclusively occupies the super memory block based on a sharing level of the first namespace.

In another aspect, embodiments of the present disclosure may provide a memory system including a memory device including a plurality of memory blocks, some of the plurality of memory blocks forming a super memory block and a controller coupled to the plurality of memory blocks.

The controller may divide a data storage space of the memory device into multiple namespaces including first and second namespaces, each name space having a set sharing level.

The controller may map the super memory block to one or both of first and second namespaces based on respective sharing levels of the first and second namespaces.

The controller may perform an operation on the super memory block.

According to embodiments of the present disclosure, it is possible to efficiently store data in a plurality of namespaces.

In addition, according to embodiments of the present disclosure, it is possible to minimize an increase in time taken for formatting each of a plurality of namespaces.

BRIEF DESCRIPTION OF THE DRAWINGS

The above and other aspects, features and advantages of the present disclosure will become more apparent from the following detailed description taken in conjunction with the accompanying drawings, in which.

DETAILED DESCRIPTION OF EMBODIMENTS

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s).

Figure 1:
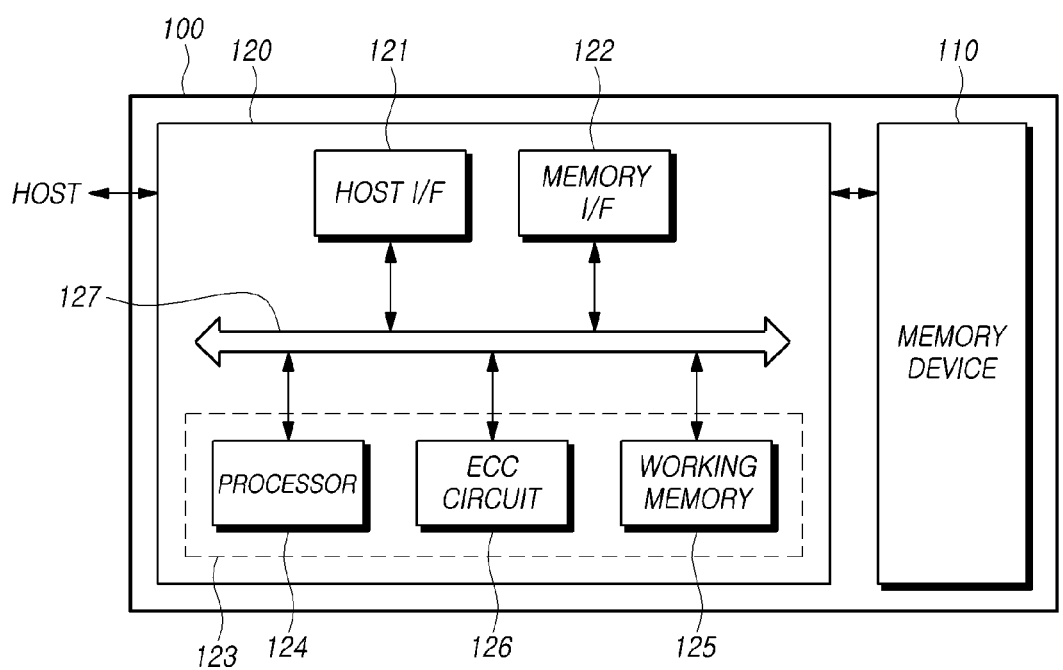
FIG. 1 is a schematic diagram illustrating a configuration of a memory system according to an embodiment of the present disclosure.

FIG. 1 is a schematic diagram illustrating a configuration of a memory system 100 according to an embodiment of the present disclosure.

Referring to FIG. 1, the memory system 100 may include a memory device 110 configured to store data, and a memory controller 120 configured to control the memory device 110.

The memory device 110 may include multiple memory blocks. The memory device 110 may be configured to operate in response to control signals received from the memory controller 120. Operations of the memory device 110 may include, for example, a read operation, a program operation (also referred to as a "write operation") and an erase operation.

The memory device 110 may include a memory cell array including multiple memory cells (also simply referred to as "cells") configured to store data. The memory cell array may exist inside a memory block.

For example, the memory device 110 may be implemented by any of various types of memories, such as a double data rate synchronous dynamic random access memory (DDR SDRAM), a low power double data rate4 (LPDDR4) SDRAM, a graphics double data rate (GDDR) SDRAM, a low power DDR (LPDDR), a rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Embodiments of the present disclosure are applicable not only to a flash memory device having an electric charge storage layer configured as a conductive floating gate, but also to a flash memory device having a charge trap flash (CTF) having an electric charge storage layer configured as an insulating film.

The memory device 110 may be configured to receive a command and an address from the memory controller 120 and to access an area of the memory cell array, which is selected by the address. That is, the memory device 110 may perform an operation corresponding to the received command in a memory area of the memory device having a physical address corresponding to the received address from the controller.

For example, the memory device 110 may perform a program operation, a read operation and an erase operation. During the program operation, the memory device 110 may program data in the area selected by the address. During the read operation, the memory device 110 may read data from the area selected by the address. During the erase operation, the memory device 110 may erase data stored in the area selected by the address.

The memory controller 120 may control write (i.e., program), read, erase, and background operations with regard to the memory device 110. The background operation may include, for example, a garbage collection operation (GC), a wear leveling (WL) operation, and/or a bad block management (BBM) operation.

The memory controller 120 may control the operation of the memory device 110 at the request of a host. Alternatively, the memory controller 120 may control the operation of the memory device 110 without a corresponding request of the host, such as, for example, when it performs one or more background operations of the memory device 110.

The memory controller 120 and the host may be separate devices. In another embodiment, the memory controller 120 and the host may be integrated and implemented as a single device. In the following description, the memory controller 120 and the host are separate devices.

In FIG. 1, the memory controller 120 may include a host interface (I/F) 121, a memory interface 122 and a control circuit 123.

The host interface 121 may be configured to provide an interface for communication with the host.

When receiving a command from the host (HOST), the control circuit 123 may receive the command through the host interface 121 and may perform an operation of processing the received command.

The memory interface 122 may be connected to the memory device 110 to provide an interface for communication with the memory device 110. That is, the memory interface 122 may be configured to provide the memory device 110 and the memory controller 120 with an interface in response to a control of the control circuit 123.

The control circuit 123 may be configured to control operation of the memory device 110 by exercising overall control of the memory controller 120. For example, the control circuit 123 may include a processor 124 and a working memory 125. The control circuit 123 may further include an error detection and correction circuit (i.e., ECC circuit) 126.

The processor 124 may control overall operation of the memory controller 120. The processor 124 may perform a logical operation. The processor 124 may communicate with the host through the host interface 121. The processor 124 may communicate with the memory device 110 through the memory interface 122.

The processor 124 may perform a function of a flash translation layer (FTL). The processor 124 may translate a logical block address (LBA) provided by the host into a physical block address (PBA) through the FTL. The FTL may receive the LBA and translate the LBA into the PBA using a mapping table.

There are various address mapping methods which may be employed by the FTL, according to the mapping unit. Typical address mapping methods include a page mapping method, a block mapping method, and a hybrid mapping method.

The processor 124 may be configured to randomize data received from the host. For example, the processor 124 may randomize data received from the host using a randomizing seed. The randomized data is provided to the memory device 110 as data to be stored, and is programmed in the memory cell array.

The processor 124 may be configured to derandomize data received from the memory device 110 during a read operation. For example, the processor 124 may derandomize data received from the memory device 110 using a derandomizing seed. The derandomized data may be output to the host.

The processor 124 may execute firmware (FW) so as to control the operation of the memory controller 120. In other words, the processor 124 may control overall operation of the memory controller 120 and, in order to perform a logical operation, may execute (i.e., drive) firmware loaded into the working memory 125 during booting.

The firmware refers to a program executed inside the memory system 100, and may include various functional layers.

For example, the firmware may include a flash translation layer (FTL), a host interface layer (HIL) and/or a flash interface layer (FIL). As mentioned above, the FTL is configured to translate between a logical address, received from the host, and a physical address of the memory device 110. The HIL is configured to interpret a command that the host issues to the memory system 100 (or storage device) and to deliver the same to the FTL. The FIL is configured to deliver a command issued by the FTL to the memory device 110.

For example, the firmware may be stored in the memory device 110, then loaded into the working memory 125.

The working memory 125 may store firmware, program codes, commands, or pieces of data necessary to drive the memory controller 120. The working memory 125 may include, for example, a static RAM (SRAM), a dynamic RAM (DRAM), and/or a synchronous RAM (SDRAM) as a volatile memory.

The error detection/correction circuit 126 may be configured to detect one or more error bits of target data by using an error correction code, and to correct the detected error bit(s). For example, the target data may be data stored in the working memory 125, data retrieved from the memory device 110, or the like.

The error detection/correction circuit 126 may be implemented to decode data using the error correction code. The error detection/correction circuit 126 may be implemented using various code decoders. For example, the error detection/correction circuit 126 may be implemented with a decoder that performs nonsystematic code decoding or a decoder that performs systematic code decoding.

For example, the error detection/correction circuit 126 may detect error bit(s), sector by sector, with regard to each piece of read data. That is, each piece of read data may include multiple sectors. As used herein, a sector may refer to a data unit smaller than the read unit (i.e., page) of a flash memory. Sectors constituting each piece of read data may correspond to each other via an address.

The error detection/correction circuit 126 may calculate a bit error rate (BER) and determine whether or not correction can be made sector by sector. For example, if the BER is higher than a reference value, the error detection/correction circuit 126 may determine that the corresponding sector is uncorrectable or "a fail". If the BER is lower than the reference value, the error detection/correction circuit 126 may determine that the corresponding sector is correctable or "a pass".

The error detection/correction circuit 126 may perform error detection and correction operations successively with regard to all pieces of read data. When a sector in the read data is correctable, the error detection/correction circuit 126 may omit the error detection and correction operations related to the corresponding sector with regard to the next piece of read data. After finishing error detection and correction operations with regard to all pieces of read data in this manner, the error detection/correction circuit 126 may detect a sector deemed uncorrectable to the end. There may be one or more sectors deemed uncorrectable. The error detection/correction circuit 126 may deliver information (for example, address information) regarding the sectors deemed uncorrectable to the processor 124.

The bus 127 may be configured to provide a channel between the constituent elements 121, 122, 124, 125, and 126 of the memory controller 120. The bus 127 may include, for example, a control bus for delivering various kinds of control signals and commands, and a data bus for delivering various kinds of data.

The above-mentioned constituent elements 121, 122, 124, 125, and 126 of the memory controller 120 are only provided as examples. One or more of these elements may be omitted, and/or one or more of these elements may be integrated into a single element. Of course, the memory controller 120 may also contain one or more other elements in addition to the elements identified above.

Hereinafter, the memory device 110 is described in more detail with reference to FIG. 2.

Figure 2:
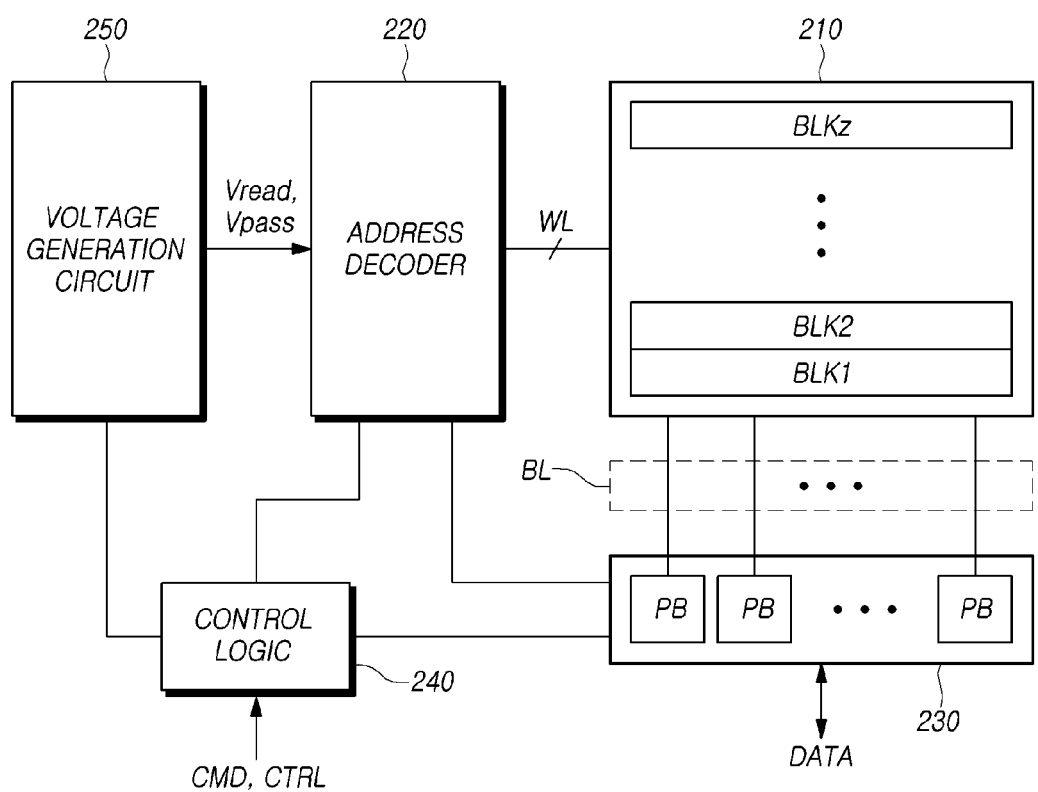
FIG. 2 is a block diagram schematically illustrating a memory device according to an embodiment of the present disclosure.

FIG. 2 is a block diagram schematically illustrating a memory device 110 according to an embodiment of the present disclosure.

Referring to FIG. 2, the memory device 110 may include a memory cell array 210, an address decoder 220, a read/write circuit 230, control logic 240, and a voltage generation circuit 250.

The memory cell array 210 may include multiple memory blocks BLK1-BLKz (where z is a natural number greater than or equal to 2).

In the multiple memory blocks BLK1-BLKz, multiple word lines WL and multiple bit lines BL may be disposed, and multiple memory cells MC may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. For example, the multiple memory cells are nonvolatile memory cells, and may include nonvolatile memory cells having a vertical channel structure.

The memory cell array 210 may be configured as a memory cell array having a two-dimensional structure and, in some cases, may be configured as a memory cell array having a three-dimensional structure.

Each of the multiple memory cells in the memory cell array 210 may store at least one bit of data. For example, each of the multiple memory cells may be a single-level cell (SLC) configured to store one bit of data, a multi-level cell (MLC) configured to store two bits of data, a triple-level cell (TLC) configured to store three bits of data, or a quad-level cell (QLC) configured to store four bits of data. As another example, the memory cell array 210 may include multiple memory cells, each of which may be configured to store five or more bits of data.

In FIG. 2, the address decoder 220, the read/write circuit 230, the control logic 240, and the voltage generation circuit 250 may operate as a peripheral circuit configured to drive the memory cell array 210.

The address decoder 220 may be connected to the memory cell array 210 through the multiple word lines WL.

The address decoder 220 may be configured to operate in response to a control of the control logic 240.

The address decoder 220 may receive addresses through an input/output buffer (not shown) inside the memory device 110. The address decoder 220 may be configured to decode a block address among the received addresses. The address decoder 220 may select at least one memory block according to the decoded block address.

The address decoder 220 may receive a read voltage Vread and a pass voltage Vpass from the voltage generation circuit 250.

During a read operation, the address decoder 220 may apply the read voltage Vread to a selected word line WL inside a selected memory block and may apply the pass voltage Vpass to the remaining non-selected word lines WL.

During a program verification operation, the address decoder 220 may apply a verification voltage generated by the voltage generation circuit 250 to a selected word line WL inside a selected memory block and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line according to the block address and the row address. The column address may be decoded by the address decoder 220 and provided to the read/write circuit 230.

The address decoder 220 may include a block decoder, a row decoder, a column decoder, and/or an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The read/write circuit 230 is also referred to as a page buffer circuit including multiple page buffers PB, or a data register circuit. The read/write circuit 230 may include a data buffer that participates in a data processing function and, in some cases, may further include a cache buffer that operates in a caching function.

The multiple page buffers PB may be connected to the memory cell array 210 through the multiple bit lines BL. In order to sense the threshold voltage Vth of the memory cells during a read operation and a program verification operation, the multiple page buffers PB may continuously supply a sensing current to the bit lines BL connected to the memory cells, may sense, through a sensing node, a change in the amount of current that flows according to the program state of a corresponding memory cell, and may latch the same as sensing data.

The read/write circuit 230 may operate in response to page buffer control signals output from the control logic 240.

During a read operation, the read/write circuit 230 senses data in a memory cell, temporarily stores the retrieved data, and outputs the data (DATA) to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control overall operation of the memory device 110 in response to the control signal CTRL. The control logic 240 may output a control signal for adjusting the pre-charge potential level of sensing nodes of multiple page buffers PB.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

Figure 3:
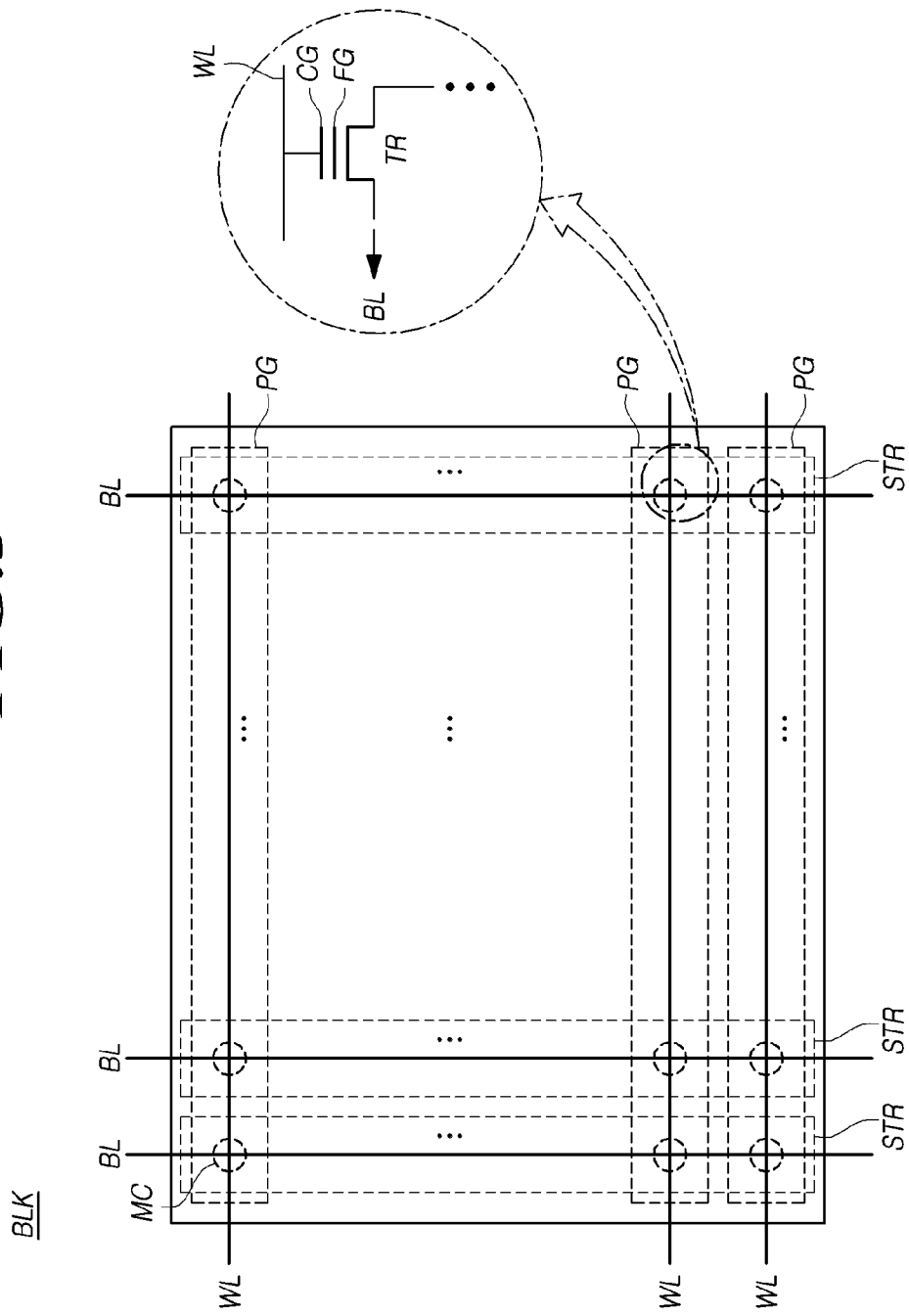
FIG. 3 is a diagram schematically illustrating a memory block of a memory device according to an embodiment of the present disclosure.

FIG. 3 is a diagram schematically illustrating a memory block BLK of a memory device 110 according to an embodiment of the present disclosure.

Referring to FIG. 3, the memory block BLK may be arranged and configured in such direction that multiple pages PG and multiple strings STR intersect.

The multiple pages PG correspond to multiple word lines WL, and the multiple strings STR correspond to multiple bit lines BL.

In the memory block BLK, multiple word lines WL and multiple bit lines BL may be arranged to intersect. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

The multiple word lines WL and the multiple bit lines BL may intersect with each other, thereby defining multiple memory cells MC. Each memory cell MC may have a transistor TR arranged therein.

For example, the transistor TR may include a drain, a source, and a gate. The drain (or source) of the transistor TR may be connected to the corresponding bit line BL directly or via another transistor TR. The source (or drain) of the transistor TR may be connected to the source line (which may be the ground) directly or via another transistor TR. The gate of the transistor TR may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some cases, at least one dummy word line may be additionally arranged between the first outermost word line and the first selection line. In addition, dummy word line(s) may be additionally arranged between the second outermost word line and the second selection line.

In the case of a memory block structure as illustrated in FIG. 3, a read operation and a program operation (i.e., write operation) may be performed page by page, and an erase operation may be performed memory block by memory block.

Figure 4:
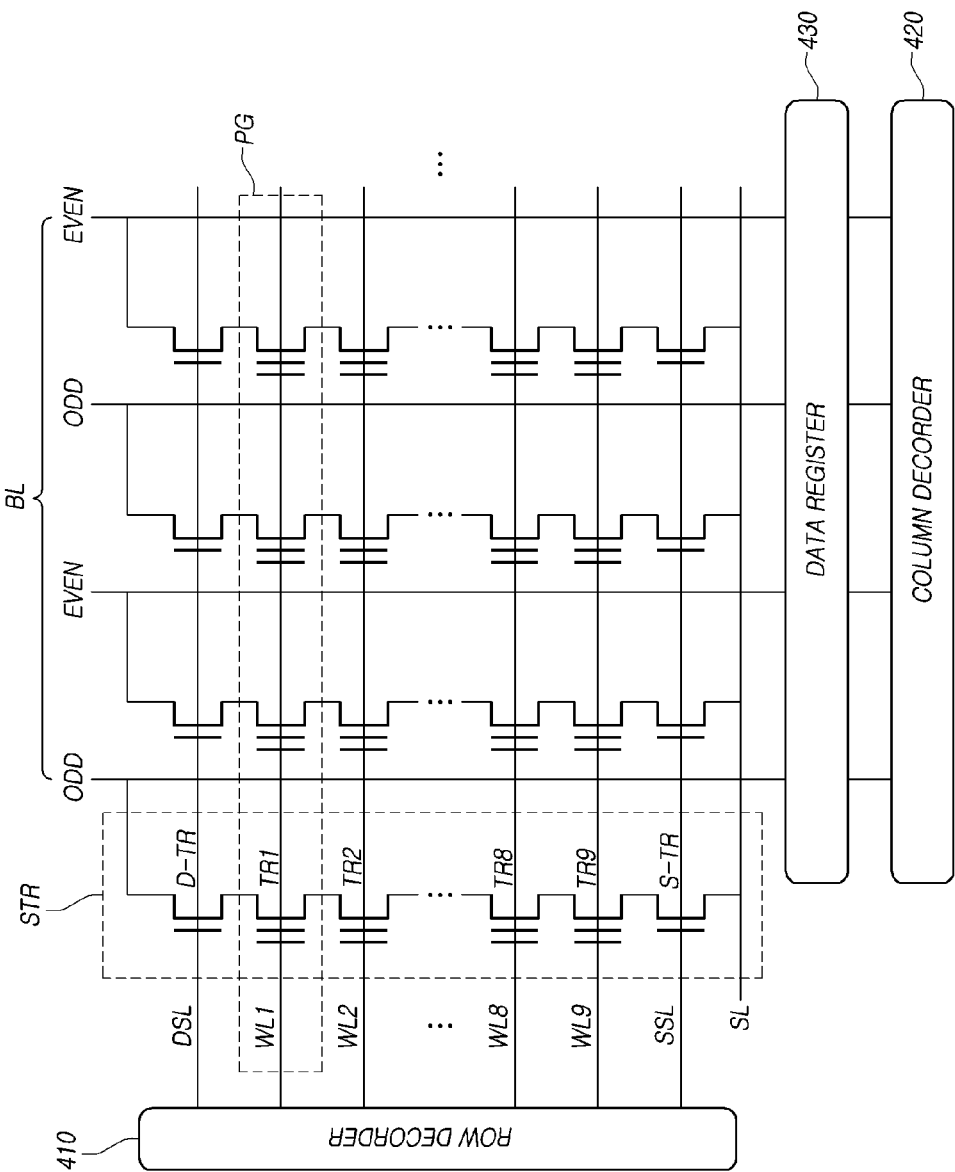
FIG. 4 is a diagram illustrating the structure of word lines and bit lines of a memory device according to an embodiment of the present disclosure.

FIG. 4 is a diagram illustrating a structure of word lines WL and bit lines BL of a memory device 110 according to an embodiment of the present disclosure.

Referring to FIG. 4, the memory device 110 has a core area in which memory cells MC are concentrated, and an auxiliary area which corresponds to the remaining non-core area. The auxiliary area supports the operations of the memory cell array 210.

The core area may include pages PG and strings STR. In the core area, multiple word lines WL1-WL9 and multiple bit lines BL are arranged to intersect.

The word lines WL1-WL9 may be connected to a row decoder 410. The bit lines BL may be connected to a column decoder 420. A data register 430, which corresponds to the read/write circuit 230 of FIG. 2, may exist between the multiple bit lines BL and the column decoder 420.

The multiple word lines WL1-WL9 may correspond to multiple pages PG.

For example, each of the multiple word lines WL1-WL9 may correspond to one page PG as illustrated in FIG. 4. In contrast, when each of the multiple word lines WL1-WL9 has a large size, each of the multiple word lines WL1-WL9 may correspond to at least two (for example, two or four) pages PG. Each page PG is the smallest unit in connection with conducting a program operation and a read operation, and all memory cells MC within the same page PG may perform simultaneous operations when conducting a program operation and a read operation.

The multiple bit lines BL, which include alternating odd- and even-numbered bit lines, may be connected to the column decoder 420.

For accessing a memory cell MC, the address may be input to the core area first through the input/output end and then through the row decoder 410 and the column decoder 420 such that a corresponding target memory cell can be designated. As used herein, designating a target memory cell refers to accessing one of the memory cells MC at the sites of intersection between the word lines WL1-WL9 connected to the row decoder 410 and the bit lines BL connected to the column decoder 420, for programming data therein or for reading programmed data therefrom.

Pages PG in a first direction (for example, X-axis direction) are bound by a commonly used line referred to as a word line WL, and strings STR in a second direction (for example, Y-axis direction) are bound (connected) by a common line referred to as a bit line BL. As used herein, being commonly bound refers to being structurally connected by the same material and simultaneously receiving the same voltage during voltage application. The voltage applied to a memory cell MC among memory cells MC connected in series may slightly differ from the voltage applied to another memory cell MC further down the line, due to the voltage drop across the preceding memory cell MC.

The data register 430 plays an important role because all data processing by the memory device 110, including program and read operations, occurs via the data register 430. If data processing by the data register 430 is delayed, all the other areas need to wait until the data register 430 finishes the data processing. In addition, degradation of performance of the data register 430 may degrade overall performance of the memory device 110.

In the example illustrated in FIG. 4, in one string STR, multiple transistors TR1-TR9 connected to multiple word lines WL1-WL9 may exist. The areas in which the multiple transistors TR1-TR9 exist correspond to memory cells MC. As used herein, the multiple transistors TR1-TR9 refer to transistors including control gates CG and floating gates FG.

The multiple word lines WL1-WL9 include two outermost word lines WL1 and WL9. A first selection line DSL may be additionally arranged outside the first outermost word line WL1, which is closer to the data register 430 in terms of the signal path among the two outermost word lines WL1 and WL9, and a second selection line SSL may be additionally arranged outside the other second outermost word line WL9.

The first selection transistor D-TR, which is controlled to turn on/off by the first selection line DSL, has a gate electrode connected to the first selection line DSL, but includes no floating gate FG. The second selection transistor S-TR, which is controlled to turn on/off by the second selection line SSL, has a gate electrode connected to the second selection line SSL, but includes no floating gate FG.

The first selection transistor D-TR plays the role of a switch that turns on or off the connection between the corresponding string STR and the data register 430. The second selection transistor S-TR plays the role of a switch that turns on or off the connection between the corresponding string STR and the source line SL. That is, the first selection transistor D-TR and the second selection transistor S-TR play the role of gatekeepers which are positioned at opposite ends of the corresponding string STR and deliver/block signals.

The memory system 100 needs to fill the target memory cell MC of the bit line BL to be programmed with electrons during a program operation. Accordingly, the memory system 100 applies a turn-on voltage Vcc to the gate electrode of the first selection transistor D-TR, thereby turning on the first selection transistor D-TR, and applies a turn-off voltage (for example, 0V) to the gate electrode of the second selection transistor S-TR, thereby turning off the second selection transistor S-TR.

The memory system 100 turns on both the first selection transistor D-TR and the second selection transistor S-TR during a read operation or a verification operation. Accordingly, an electric current may flow through the corresponding string STR and drain to the source line SL, which corresponds to the ground, such that the voltage level of the bit line BL can be measured. However, during a read operation, there may be a time difference in on/off timing between the first selection transistor D-TR and the second selection transistor S-TR.

The memory system 100 may supply a voltage (for example, +20V) to the substrate through a source line SL during an erase operation. The memory system 100 floats both the first selection transistor D-TR and the second selection transistor S-TR during an erase operation, thereby generating an infinite resistance. As a result, the role of the first selection transistor D-TR and that of the second selection transistor S-TR may be removed, and electrons may operate only between the floating gate FG and the substrate due to the potential difference.

Figure 5:
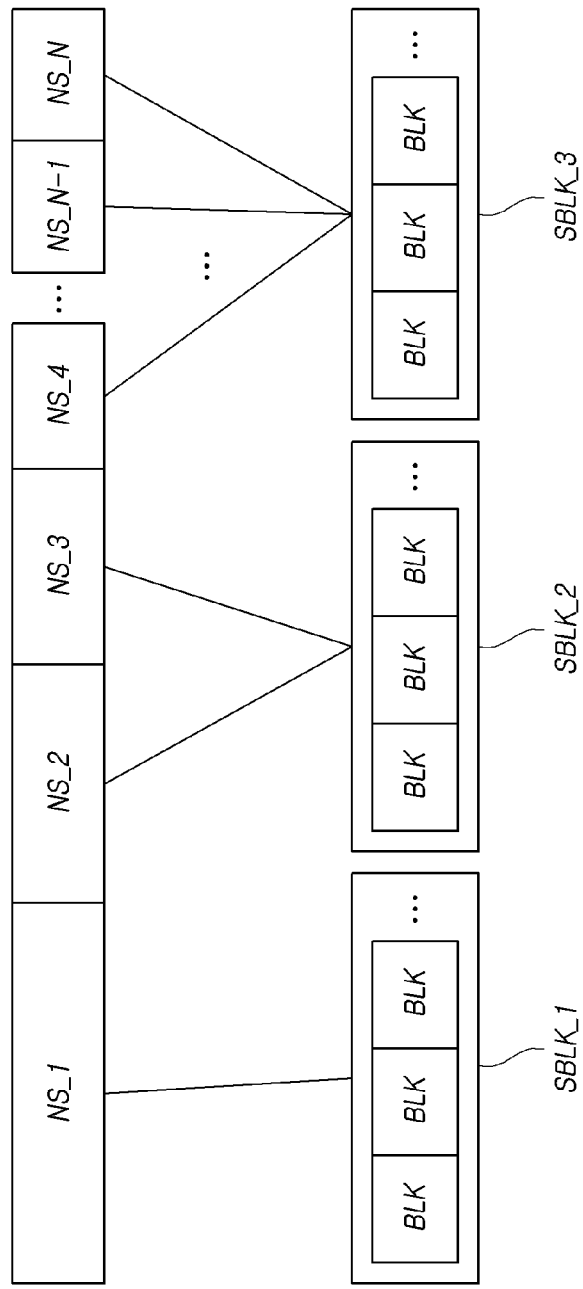
FIG. 5 is a diagram illustrating an example of the relationship between a namespace and a super memory block in a memory system according to an embodiment of the present disclosure.

FIG. 5 is a diagram illustrating an example of the relationship between a namespace and a super memory block in the memory system 100 of FIG. 1 according to an embodiment of the present disclosure.

Referring to FIG. 5, the memory controller 120 of the memory system 100 may divide a data storage space of the memory device 110 into N namespaces (where N is a natural number of 2 or more).

Each namespace denotes a plurality of logical spaces that are obtained by dividing a data storage space.

Each of the N namespaces may have the same or different sizes (i.e., capacities), and may have the same or different protection types. In this case, a host may indicate information such as to the size and protection type of each of the N namespaces.

The host may recognize the N namespaces as N different logical areas (or partitions). In addition, the host may instruct the memory controller 120 to format the respective namespaces separately.

In this case, the memory controller 120 may perform control such that one of the N namespaces, i) shares a super memory block, which includes some of a plurality of memory blocks in the memory device 110, with another of the N namespaces, or ii) occupies the super memory block independently, i.e., exclusively.

The super memory block may be a logical unit in which the memory controller 120 manages a plurality of memory blocks in the memory device 110. For example, the memory controller 120 may configure an open block in units of super memory blocks when writing data in the memory device 110.

The namespace independently occupying the super memory block means that only data corresponding to the namespace may be stored (i.e., programmed) in the corresponding super memory block. That is, the corresponding super memory block exclusively stores the data of that namespace.

On the other hand, different namespaces sharing the super memory block mean that the data corresponding to the different namespaces may be stored together in the corresponding super memory block.

Referring to FIG. 5, the memory controller 120 may perform control such that a namespace NS_1 independently occupies a super memory block SBLK_1.

In addition, the memory controller 120 may perform control such that a namespace NS_2 and a namespace NS_3 share a super memory block SBLK_2.

In addition, the memory controller 120 may perform control such that namespaces NS_4 to NS_N share a super memory block SBLK_3.

Each of the super memory blocks SBLK_1, SBLK_2, and SBLK_3 may include a plurality of memory blocks BLK.

The reason why the memory controller 120 performs control such that a namespace independently occupies one super memory block and other namespaces share one super memory block, as described above, is as follows.

If each of the N namespaces independently occupies one super memory block, the time required to format each of the namespaces may be reduced. This is due to the fact that the memory controller 120 may complete formatting of the namespace by erasing the respective memory blocks in the super memory blocks because only data corresponding to one namespace is stored in each super memory block.

On the other hand, if each of the namespaces independently occupies one super memory block, since the data stored in the respective namespaces is distributed to different super memory blocks, the operation of writing data in the memory device 110 may be performed inefficiently.

For example, it is assumed that two namespaces independently occupy different super memory blocks. In this case, if the host transmits, to the memory controller 120, a request for simultaneously writing data to the two namespaces, the memory controller 120 must open two different super memory blocks and write data therein.

On the other hand, in the case where two namespaces share one super memory block, even if the host transmits, to the memory controller 120, a request for simultaneously writing data in the two namespaces, the memory controller 120 only has to open one super memory block and write data therein. Thus, it is possible to perform a more efficient data writing operation.

In addition, if sudden power-off (SPO) occurs while the memory controller 120 is simultaneously writing data in two namespaces, the time required for the operation of recovering the SPO may increase.

If two namespaces independently occupy different super memory blocks, the memory controller 120 must perform the recovery operation on both super memory blocks. On the other hand, in the case where two namespaces share one super memory block, the memory controller 120 only has to perform the recovery operation on one super memory block, thereby performing the recovery operation on the SPO more quickly.

On the other hand, if all of the N namespaces share one super memory block, it is possible to efficiently use the data storage space of the memory device 110. This is due to the fact that all of the data corresponding to one of the N namespaces may be written in one super memory block.

However, if all of the N namespaces share one super memory block, the time required to format the respective namespaces may increase.

This is due to the fact that since data corresponding to different namespaces is stored together in one super memory block, the memory controller 120 can erase the memory block in the super memory block only after moving the data corresponding to the namespace, which is not to be formatted, to another super memory block.

Accordingly, taking into account the trade-off between the two arrangements described above, an embodiment of the present disclosure employs both arrangements. That is, the memory controller 120 of the memory system 100 may perform control such that a namespace independently occupies one super memory block and other namespaces share a different super memory block.

Accordingly, it is possible to minimize the increase in the time required to format each of a plurality of namespaces while allowing the memory system 100 to efficiently store data in the plurality of namespaces.

Hereinafter, a method for the memory controller 120 to configure a namespace that independently occupies one super memory block and multiple namespaces that share a different super memory block is described in detail.

Figure 6:
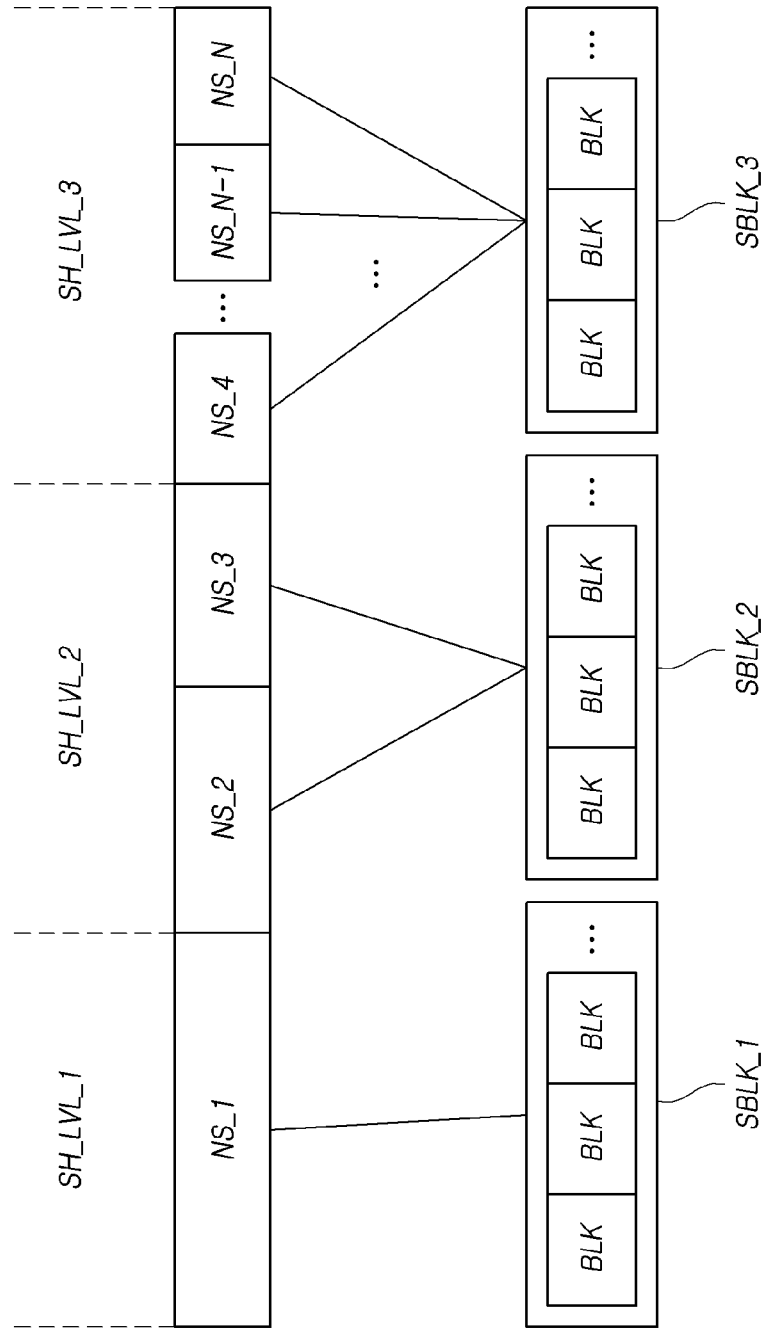
FIG. 6 is a diagram illustrating an example of the relationship between a namespace and a super memory block depending on a sharing level in a memory system according to an embodiment of the present disclosure.

FIG. 6 is a diagram illustrating an example of the relationship between a namespace and a super memory block depending on a sharing level in the memory system 100 of FIG. 1 according to an embodiment of the present disclosure.

Referring to FIG. 6, the memory controller 120 of the memory system 100 may perform control such that one of N namespaces, i) shares a super memory block with another, different namespace, or ii) occupies the super memory block independently on the basis of the sharing level of the first namespace.

The sharing level of a namespace is a value that indicates whether or not the corresponding namespace can independently occupy any one super memory block or indicates how many other namespaces can share a super memory block with the corresponding namespace.

In the illustrated example of FIG. 6, the memory controller 120 may perform control such that a namespace NS_1 having a sharing level SH_LVL_1 independently occupies a super memory block SBLK_1.

In addition, the memory controller 120 may perform control such that two namespaces NS_2 and NS_3 having a sharing level SH_LVL_2 share a super memory block SBLK_2.

Further, the memory controller 120 may perform control such that namespaces NS_4 to NS_N having a sharing level SH_LVL_3 share a super memory block SBLK_3.

Hereinafter, a detailed method of determining the sharing level for each of the N namespaces by the memory controller 120 of the memory system 100 is described.

Figure 7:
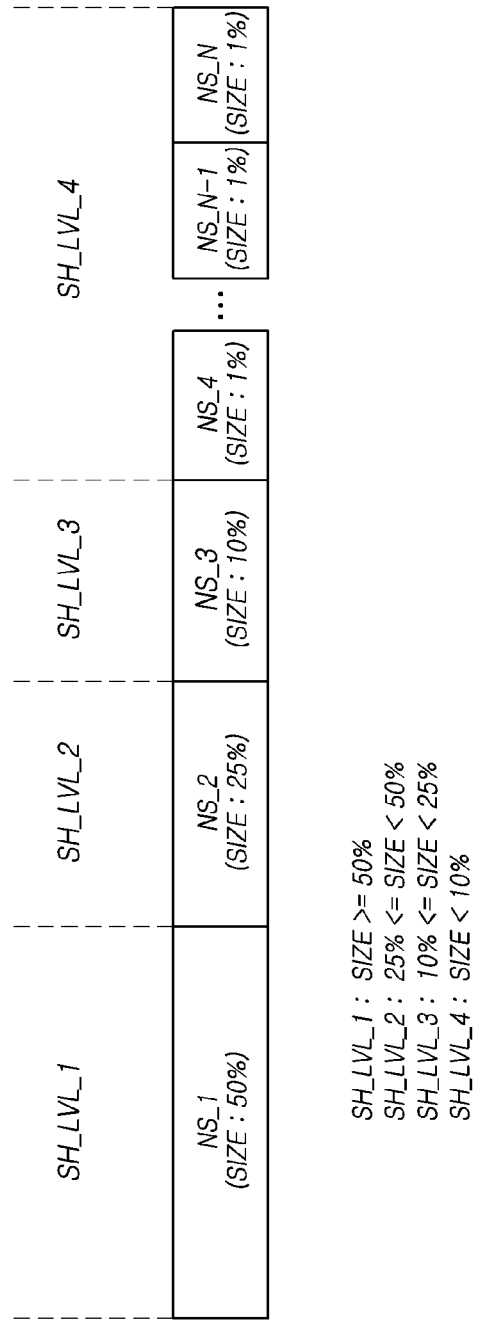
FIG. 7 is a diagram illustrating an example of determining the sharing level of a namespace in a memory system according to an embodiment of the present disclosure.

FIG. 7 is a diagram illustrating an example of determining a sharing level of a namespace in the memory system 100 of FIG. 1 according to an embodiment of the present disclosure.

Referring to FIG. 7, the sharing level of a namespace may be determined according to the ratio (%) of the size of a namespace to the total size of a data storage space of the memory device 110.

In the illustrated example of FIG. 7, the size of a namespace NS_1 is 50% of the total size of the data storage space; the size of a namespace NS_2 is 25% of the total size of the data storage space; the size of a namespace NS_3 is 10% of the total size of the data storage space; and the size of each of namespaces NS_4 to NS_N is 1% of the total size of the data storage space.

In this case, the memory controller 120 of the memory system 100 may determine sharing levels according to the size ratios of the namespaces as follows.

The memory controller 120 may set the sharing level of a namespace, the size of which is 50% of the total size of the data storage space or more, to a sharing level SH_LVL_1.

The memory controller 120 may set the sharing level of a namespace, the size of which is less than 50% and greater than or equal to 25% of the total size of the data storage space, to a sharing level SH_LVL_2.

The memory controller 120 may set the sharing level of a namespace, the size of which is less than 25% and greater than or equal to 10% of the total size of the data storage space, to a sharing level SH_LVL_3.

The memory controller 120 may set the sharing level of a namespace, the size of which is less than 10% of the total size of the data storage space, to a sharing level SH_LVL_4.

As a result, in FIG. 7, the sharing level of the namespace NS_1 is set to the sharing level SH_LVL_1. In addition, the sharing level of the namespace NS_2 is set to the sharing level SH_LVL_2. In addition, the sharing level of the namespace NS_3 is set to the sharing level SH_LVL_3. Further, the sharing levels of each of the namespaces NS_4 to NS_N is set to the sharing level SH_LVL_4.

Figure 8:
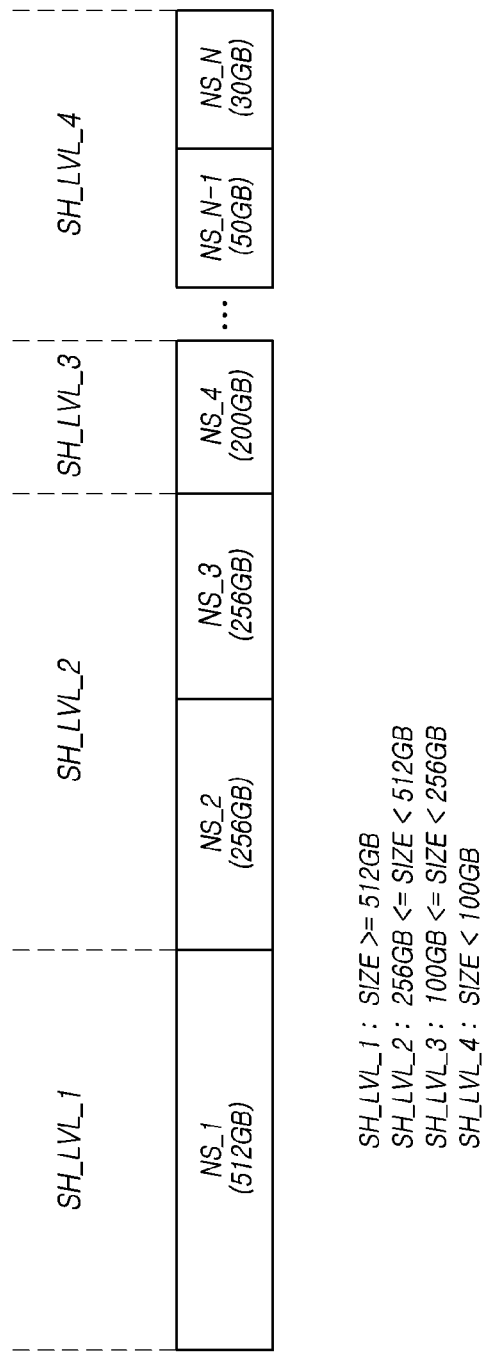
FIG. 8 is a diagram illustrating another example of determining the sharing level of a namespace in a memory system according to an embodiment of the present disclosure.

FIG. 8 is a diagram illustrating another example of determining a sharing level of a namespace in the memory system 100 of FIG. 1 according to an embodiment of the present disclosure.

Referring to FIG. 8, the sharing level of a namespace may be determined according to the size of the namespace and one or more pieces of threshold size information.

The memory controller 120 of the memory system 100 may set the sharing level of a namespace having a size, which is greater than or equal to a threshold size of 512 GB, to a sharing level SH_LVL_1.

The memory controller 120 may set the sharing level of a namespace having a size, which is less than a threshold size of 512 GB and greater than or equal to a threshold size of 256 GB, to a sharing level SH_LVL_2.

The memory controller 120 may set the sharing level of a namespace having a size, which is less than a threshold size of 256 GB and greater than or equal to a threshold size of 100 GB, to a sharing level SH_LVL_3.

The memory controller 120 may set the sharing level of a namespace having a size, which is less than a threshold size of 100 GB, to a sharing level SH_LVL_4.

As a result, in FIG. 8, the sharing level of the namespace NS_1 is set to the sharing level SH_LVL_1. In addition, the sharing levels of the namespaces NS_2 and NS_3 are set to the sharing level SH_LVL_2. In addition, the sharing level of the namespace NS_4 is set to the sharing level SH_LVL_3. Further, the sharing levels of each of the remaining namespaces including NS_N-1 and NS_N is set to the sharing level SH_LVL_4.

In FIG. 7 and FIG. 8, the larger the size (i.e., capacity) of the namespace, the smaller the number of namespaces that share one super memory block. This is due to the fact that the larger the size of the namespace, the higher the probability of that namespace occupying most of the super memory block, which reduces the efficiency obtained by sharing the corresponding super memory block with other namespaces.

Embodiments for determining the sharing levels for respective namespaces have been described above.

Hereinafter, embodiments in which each namespace independently occupies the super memory block or shares the same with other namespaces depending on the sharing level thereof are described.

Figure 9:
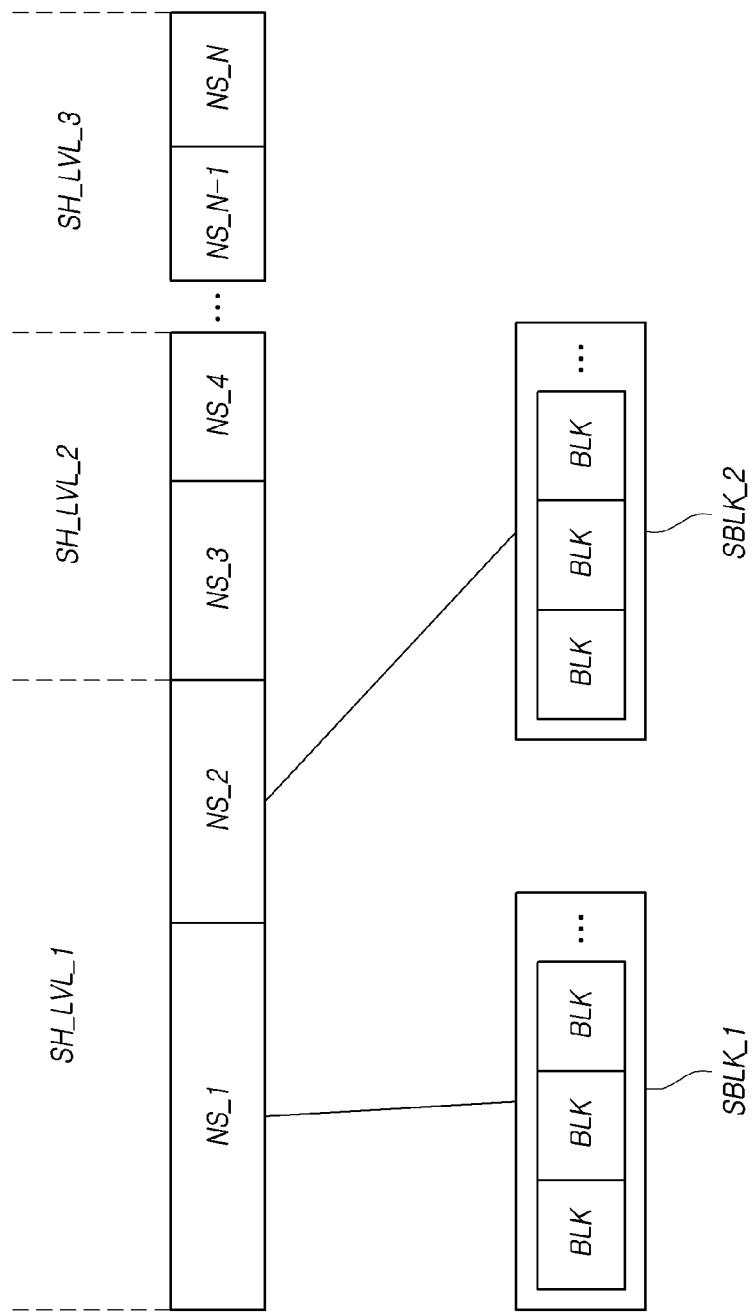
FIG. 9 is a diagram illustrating an example in which a namespace independently occupies a super memory block in a memory system according to an embodiment of the present disclosure.

FIG. 9 is a diagram illustrating an example in which a namespace independently occupies a super memory block in the memory system 100 of FIG. 1 according to an embodiment of the present disclosure.

Referring to FIG. 9, the memory controller 120 may perform control such that a namespace having a specific first sharing level independently occupies a super memory block.

In the illustrated example of FIG. 9, namespaces NS_1 and NS_2 having a sharing level SH_LVL_1 independently occupy a super memory block SBLK_1 and a super memory block SBLK_2, respectively.

Figure 10:
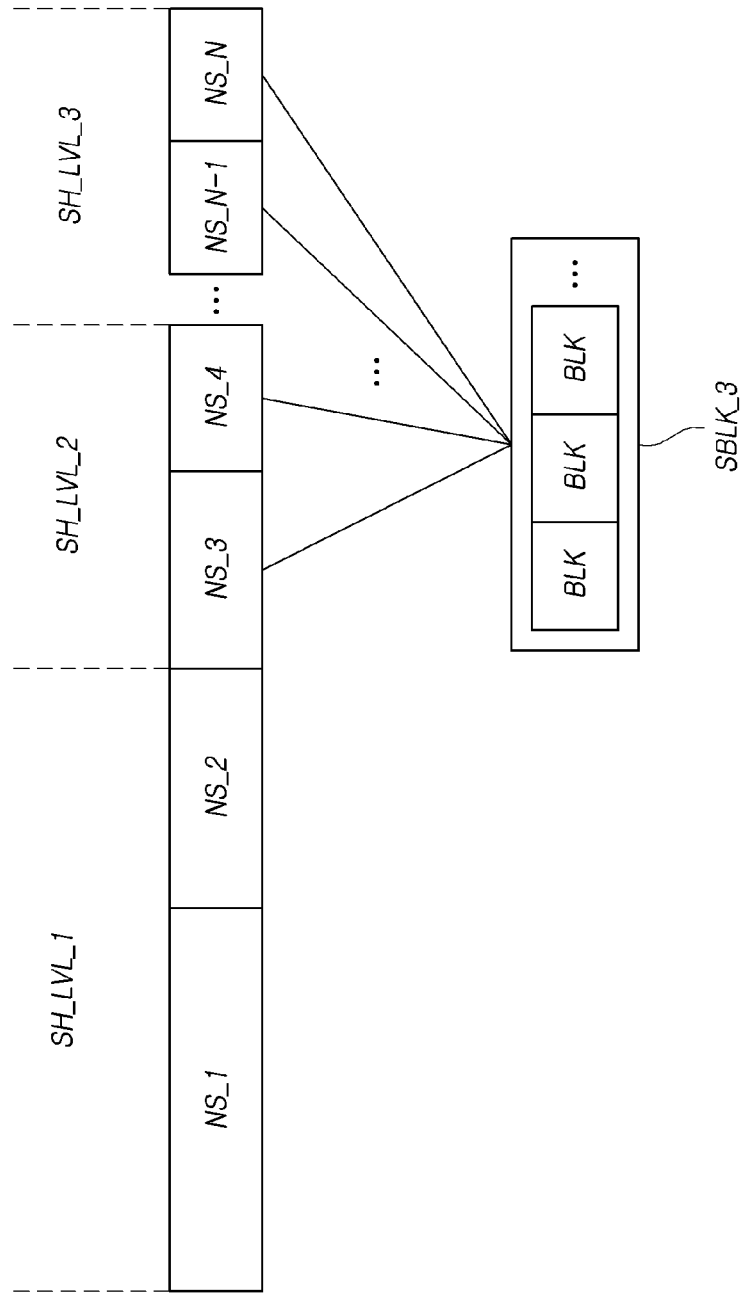
FIG. 10 is a diagram illustrating an example in which a namespace shares a super memory block with another namespace in a memory system according to an embodiment of the present disclosure.

FIG. 10 is a diagram illustrating an example in which a namespace shares a super memory block with another namespace in the memory system 100 of FIG. 1 according to an embodiment of the present disclosure.

Referring to FIG. 10, the memory controller 120 of the memory system 100 may perform control such that a namespace having a second sharing level, which is different from the first sharing level described in FIG. 9, shares a super memory block with other namespaces.

In the illustrated example of FIG. 10, namespaces NS_3, and NS_4 having a sharing level SH_LVL_2 and namespaces including NS_N-1, and NS_N having a sharing level SH_LVL_3 share a super memory block SBLK_3.

Figure 11:
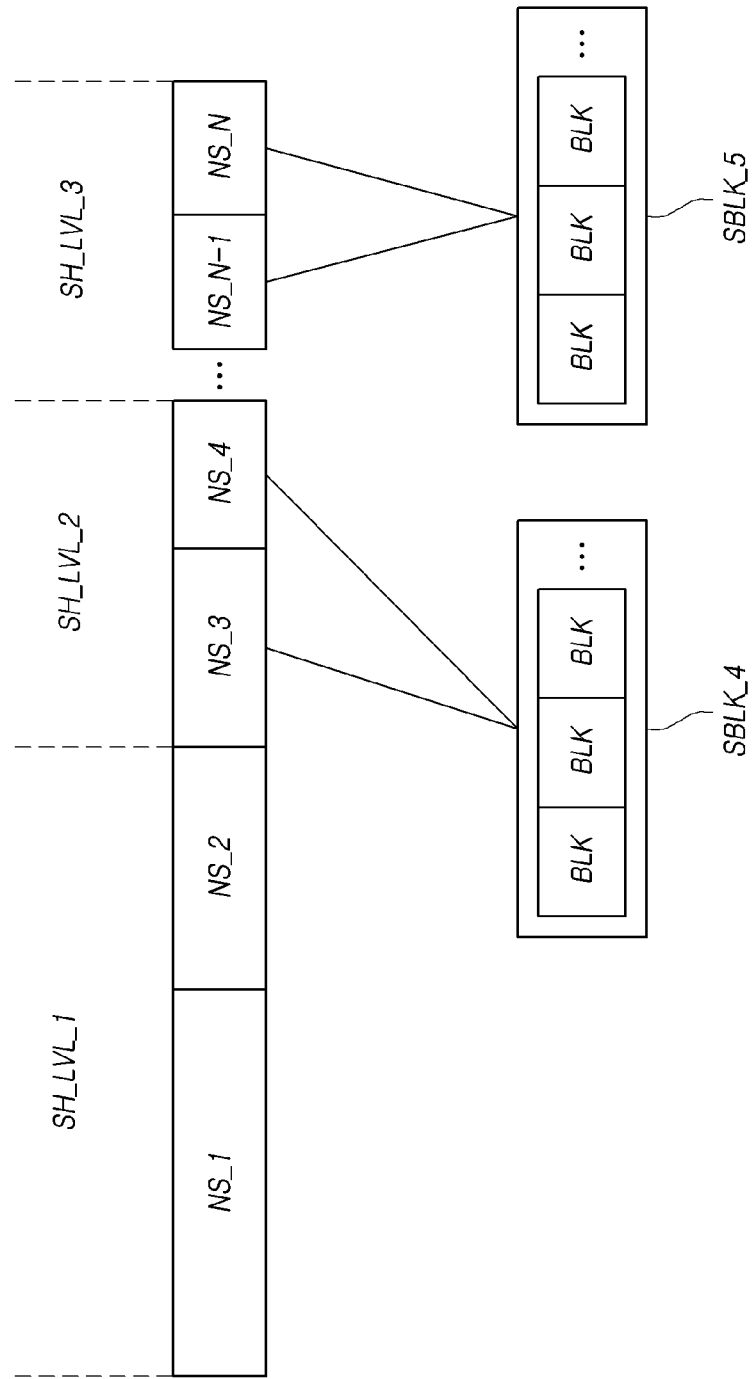
FIG. 11 is a diagram illustrating another example in which a namespace shares a super memory block with another namespace in a memory system according to an embodiment of the present disclosure.

FIG. 11 is a diagram illustrating another example in which a namespace shares a super memory block with another namespace in the memory system 100 of FIG. 1 according to an embodiment of the present disclosure.

Referring to FIG. 11, the memory controller 120 of the memory system 100 may perform control such that the namespaces sharing one super memory block have the same sharing level. That is, in the case where a first namespace and a second namespace share one super memory block, if the first namespace has a particular, e.g., second, sharing level, the second namespace also has that same, e.g., second, sharing level.

In the illustrated example of FIG. 11, namespaces NS_3 and NS_4 having the same sharing level SH_LVL_2 may share a super memory block SBLK_4.

However, namespaces including NS_N-1, and NS_N having a sharing level SH_LVL_3, which is different from the sharing level SH_LVL_2, cannot share the same super memory block SBLK_4 with the namespaces NS_3, and NS_4.

Instead, the namespace including NS_N-1, and NS_N having the sharing level SH_LVL_3 may share another super memory block SBLK_5.

Figure 12:
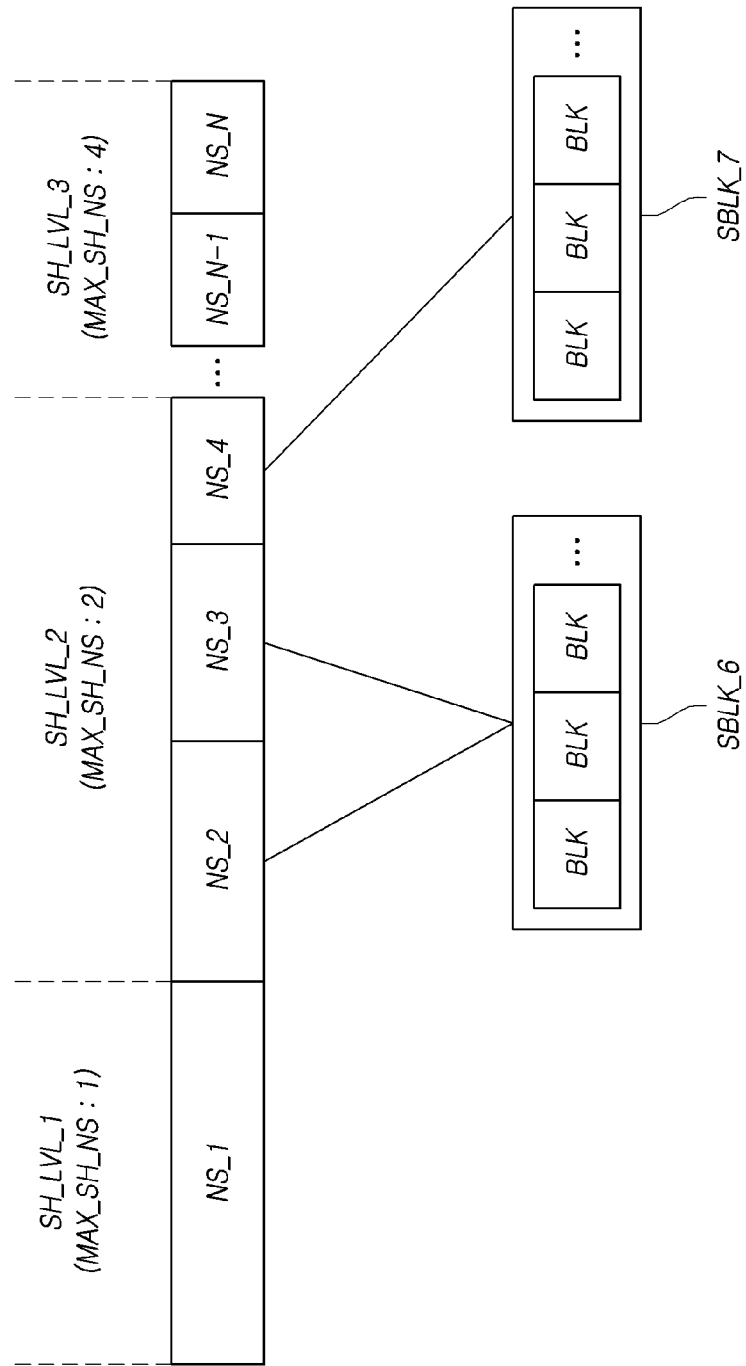
FIG. 12 is a diagram illustrating an example in which namespaces having the same sharing level occupy super memory blocks in a memory system according to an embodiment of the present disclosure.

FIG. 12 is a diagram illustrating an example in which namespaces having the same sharing level occupy super memory blocks in the memory system 100 of FIG. 1 according to an embodiment of the present disclosure.

Referring to FIG. 12, the memory controller 120 may set the maximum number of namespaces MAX_SH_NS capable of sharing one super memory block differently depending on the sharing level.

The memory controller 120 may set the maximum number of namespaces MAX_SH_NS having a sharing level SH_LVL_1 that may share one super memory block to 1.

The memory controller 120 may set the maximum number of namespaces MAX_SH_NS having a sharing level SH_LVL_2 that may share one super memory block to 2.

The memory controller 120 may set the maximum number of namespaces MAX_SH_NS having a sharing level SH_LVL_3 that may share one super memory block to 4.

In this case, a namespace having the sharing level SH_LVL_1 independently occupies one super memory block. In addition, up to two namespaces having the sharing level SH_LVL_2 may share one super memory block. Further, up to four namespaces having the sharing level SH_LVL_3 may share one super memory block.

In the illustrated example of FIG. 12, among namespaces NS_2, NS_3, and NS_4 having the sharing level SH_LVL_2, the namespaces NS_2 and NS_3 share a super memory block SBLK_6.

However, although the namespace NS_4 has the same sharing level SH_LVL_2 as the namespaces NS_2 and NS_3, the namespace NS_4 cannot share the super memory block SBLK_6 with the namespaces NS_2 and NS_3 because the maximum number of namespaces MAX_SH_NS having the sharing level SH_LVL_2 that may share one super memory block is 2.

Accordingly, the namespace NS_4 occupies another super memory block SBLK_7, instead of sharing the super memory block SBLK_6 with the namespaces NS_2 and NS_3.

The maximum number of namespaces MAX_SH_NS that have a specific sharing level and may share one super memory block may set in any of various ways.

For example, the maximum number of namespaces MAX_SH_NS capable of sharing one super memory block may be set to $2^k$ (where k is an integer).

Figure 13:
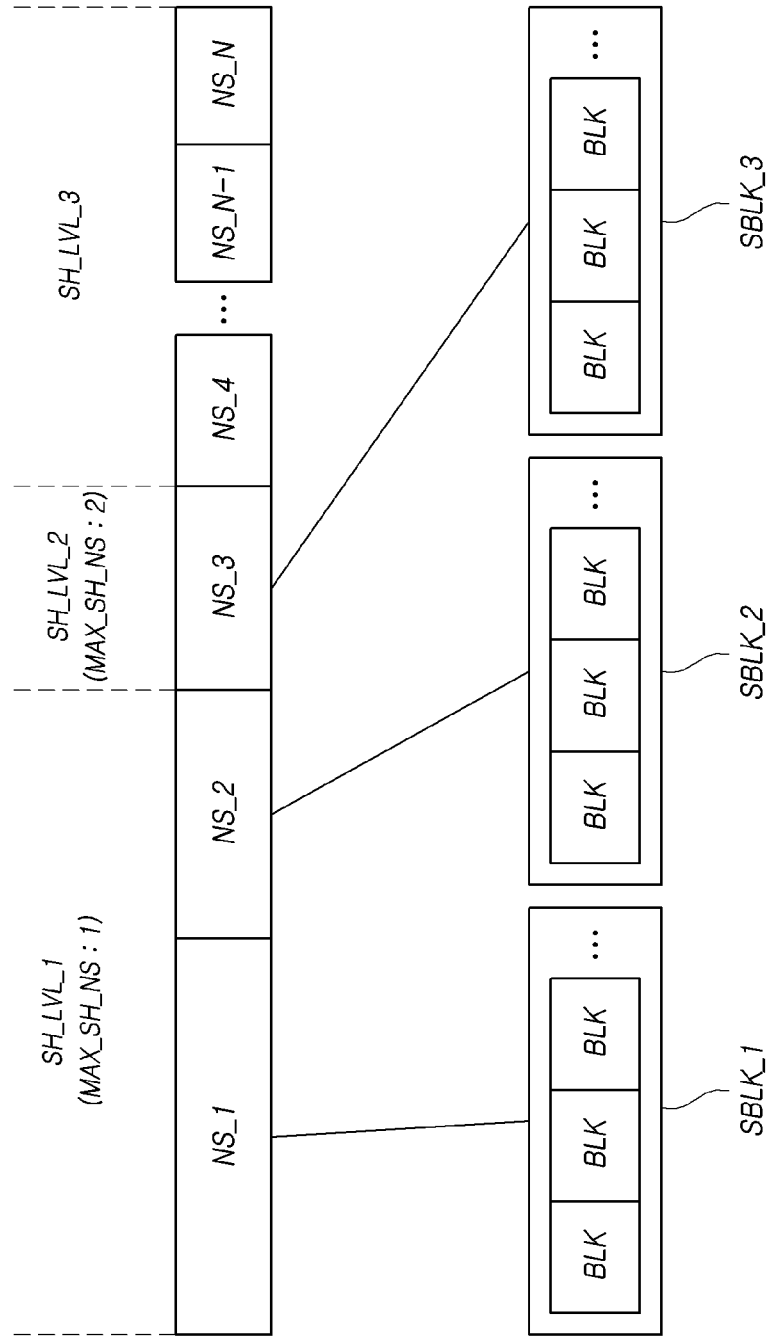
FIG. 13 is a diagram illustrating an example in which namespaces having different sharing levels occupy super memory blocks in a memory system according to an embodiment of the present disclosure.

FIG. 13 is a diagram illustrating an example in which namespaces having different sharing levels occupy super memory blocks in the memory system 100 of FIG. 1 according to an embodiment of the present disclosure.

Referring to FIG. 13, if there is only one namespace having a specific sharing level, the memory controller 120 of the memory system 100 may perform control such that the corresponding namespace independently occupies one super memory block.

In the illustrated example of FIG. 13, there is only one namespace NS_3 that has a sharing level SH_LVL_2. In this case, even if the maximum number of namespaces MAX_SH_NS having the sharing level SH_LVL_2 that may share one super memory block is set to 2, the namespace NS_3 may independently occupy a super memory block SBLK_3, instead of sharing the same with other namespaces.

The operation in which the namespace independently occupies the super memory block or shares the same with other namespaces depending on the sharing level has been described above with reference to FIGS. 6 to 13.

Hereinafter, various scenarios in which the namespace independently occupies the super memory block or shares the same with other namespaces depending on the sharing level are described.

First, it is assumed that four sharing levels L1, L2, L3, and L4 are determined, based on the ratio (%) of the size of a namespace to the total size of a data storage space in the memory device 110, as follows.

L1: SIZE>=50%
L2: 50%>SIZE>=25%
L3: 25%>SIZE>=10%
L4: 10%>SIZE>0%

In addition, it is assumed that a namespace having a sharing level L1 may independently occupy one super memory block.

In addition, it is assumed that up to two namespaces having a sharing level L2 may share one super memory block. In addition, it is assumed that up to four namespaces having a sharing level L3 may share one super memory block. Further, it is assumed that up to eight namespaces having a sharing level L4 may share one super memory block.

[Scenario 1]

It is assumed that the data storage space of the memory device 110 is divided into six namespaces NS_1, NS_2, NS_3, NS_4, NS_5, and NS_6, as shown below, and that the ratios of the sizes of the respective namespaces to the total size of the data storage space of the memory device 110 are as follows.

NS_1: 50%
NS_2: 25%
NS_3: 10%
NS_4: 5%
NS_5: 5%
NS_6: 5%

In this case, the sharing level of the namespace NS_1 is L1, and the namespace NS_1 independently occupies one super memory block.

In addition, the sharing level of the namespace NS_2 is L2, and since there is no other namespace that has the sharing level L2, the namespace NS_2 also independently occupies one super memory block.

In addition, the sharing level of the namespace NS_3 is L3, and since there is no other namespace that has the sharing level L3, the namespace NS_3 also independently occupies one super memory block.

Further, the sharing levels of the remaining namespaces NS_4, NS_5, and NS_6 are L4, and the namespaces NS_4, NS_5, and NS_6 share one super memory block with each other.

[Scenario 2]

It is assumed that the data storage space of the memory device 110 is divided into three namespaces NS_1, NS_2, and NS_3, as shown below, and that the ratios of the sizes of the respective namespaces to the total size of the data storage space of the memory device 110 are as follows.

NS_1: 40%
NS_2: 40%
NS_3: 20%

In this case, the sharing levels of the namespaces NS_1 and NS_2 are L2, and the namespaces NS_1 and NS_2 share one super memory block.

In addition, the sharing level of namespace NS_3 is L3, and since there is no other namespace that has the sharing level L3, the namespace NS_3 independently occupies one super memory block.

[Scenario 3]

It is assumed that the data storage space of the memory device 110 is divided into three namespaces NS_1, NS_2, and NS_3, as shown below, and that the ratios of the sizes of the respective namespaces to the total size of the data storage space of the memory device 110 are as follows.

NS_1: 33%
NS_2: 33%
NS_3: 33%

In this case, although the sharing levels of the namespaces NS_1, NS_2, and NS_3 are L2, up to two namespaces having the sharing level L2 may share one super memory block. Accordingly, two namespaces, e.g., NS_1 and NS_2, among the three namespaces NS_1, NS_2, and NS_3 may share one super memory is block, and the remaining namespace, e.g., NS_3 may independently occupy one super memory block.

Figure 14:
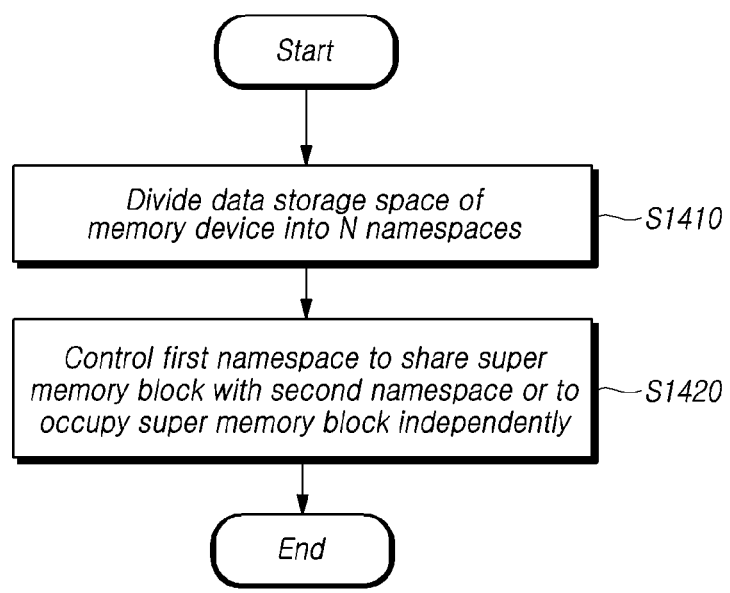
FIG. 14 is a flowchart illustrating an operation method of a memory controller according to an embodiment of the present disclosure.

FIG. 14 is a flowchart illustrating an operation method of the memory controller 120 of FIG. 1 according to an embodiment of the present disclosure.

Referring to FIG. 14, an operation method of the memory controller 120 may include a step S1410 of dividing a data storage space of the memory device 110 into N namespaces (where N is a natural number of 2 or more).

In this case, information on each of the N namespaces (e.g., a size (capacity), a protection type, or the like) may be indicated by a host.

In addition, the operation method of the memory controller 120 may include a step S1420 of performing control such that a first namespace, which is one of the N namespaces resulting from the division in step S1410, i) shares a super memory block, which includes some of a plurality of memory blocks in the memory device 110, with a second, different namespace among the N namespaces, or ii) occupies the super memory block independently.

The above-described operation of the memory controller 120 may be controlled by the control circuit 123, and the processor 124 may be performed in a manner in which various operations of the memory controller 120 execute (i.e., drive) programmed firmware.

Figure 15:
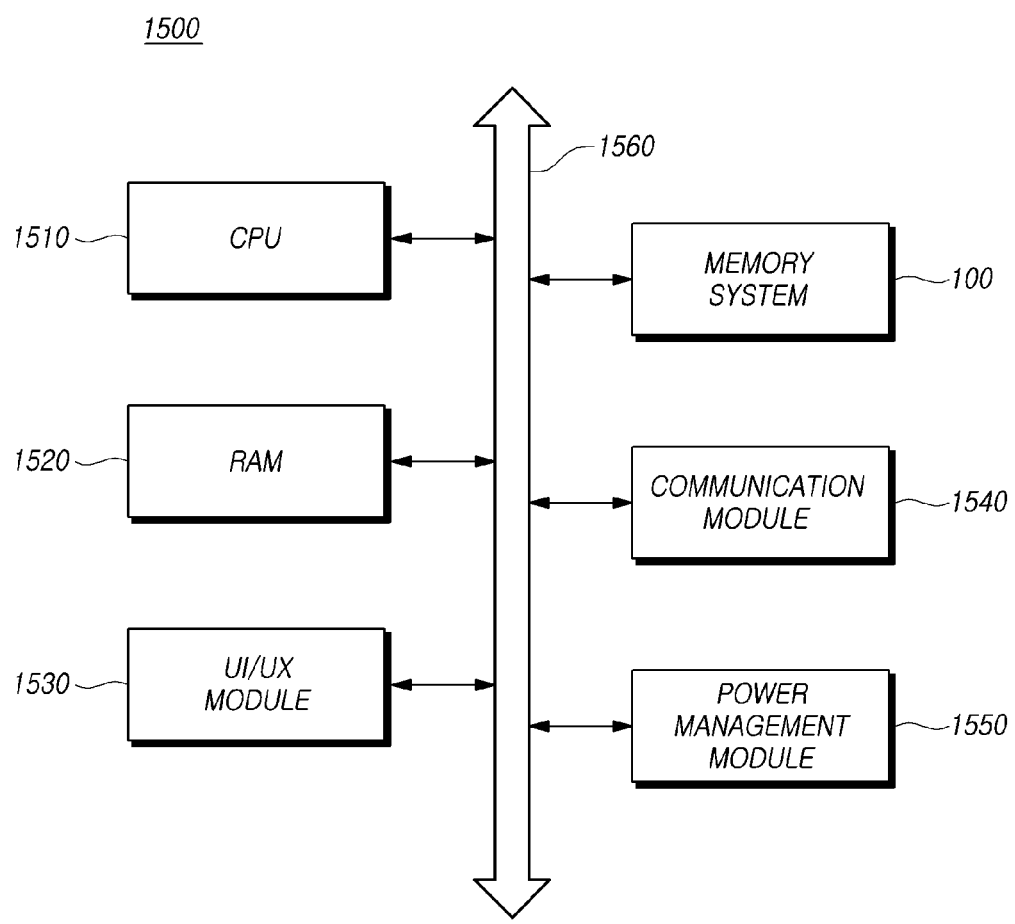
FIG. 15 is a diagram illustrating a configuration of a computing system according to an embodiment of the present disclosure.

FIG. 15 is a diagram illustrating the configuration of a is computing system 1500 according to an embodiment of the present disclosure.

Referring to FIG. 15, the computing system 1500 may include: a memory system 100 electrically connected to a system bus 1560; a central processing unit (CPU) 1510 configured to control overall operation of the computing system 1500; a random access memory (RAM) 1520 configured to store data and information related to operations of the computing system 1500; a user interface/user experience (UI/UX) module 1530 configured to provide the user with a user environment; a communication module 1540 configured to communicate with an external device in a wired and/or wireless type; and a power management module 1550 configured to manage power used by the computing system 1500.

The computing system 1500 may be a personal computer (PC) or may include a mobile terminal such as a smartphone, a tablet or any of various other electronic devices.

The computing system 1500 may further include a battery for supplying an operating voltage, an application chipset, a graphic-related module, a camera image processor, and a dynamic random access memory (DRAM). Of course, the computing system 1500 may include other elements as those skilled in the art understand.

The memory system 100 may be of a type that stores data in a magnetic disk such as a hard disk drive (HDD), or of a type that stores data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and/or other suitable memory types. In addition, the memory system 100 may be implemented as any of various storage devices mounted inside any of various electronic devices.

According to embodiments of the present disclosure described above, operation delay time of the memory system may be minimized. In addition, according to an embodiment of the present disclosure, overhead occurring in the process of calling a specific function may be minimized. Although various embodiments of the present disclosure have been illustrated and described, those skilled in the art will appreciate that various modifications, additions and substitutions are possible, without departing from the scope and spirit of the invention as set forth in the accompanying claims. That is, the present invention encompasses all modifications and variations of any of the disclosed embodiments that fall within the scope of the claims.

What is claimed is:

1. A memory system comprising:
    a memory device comprising a plurality of memory blocks; and
    a memory controller configured to control the memory device,
    wherein the memory controller is configured to:
    divide a data storage space of the memory device into N namespaces, where N is a natural number of 2 or more;
    perform control such that a first namespace of the N namespaces shares a super memory block, which comprises some of the plurality of memory blocks, with a second namespace different from the first namespace, among the N namespaces, or exclusively occupies the super memory block, based on a sharing level of the first namespace, wherein the sharing level of a namespace indicates whether the namespace exclusively occupies a specific super memory block or a number of other namespaces which share the specific super memory block with the namespace;
    determine the sharing level for the first namespace based on a ratio of a size of the first namespace to a total size of the data storage space of the memory device; and
    determine the sharing level for the second namespace based on a ratio of a size of the second namespace to the total size of the data storage space of the memory device,
    wherein data stored in the first namespace and data stored in the second namespace are stored together in the same super memory block, when the first namespace and the second namespace share the super memory block.

2. The memory system of claim 1, wherein the sharing level of the first namespace is set according to a size of the first namespace and one or more pieces of threshold size information.

3. The memory system of claim 1, wherein the memory controller is configured to,
    when the sharing level of the first namespace is a first sharing level,
    perform control such that the first namespace exclusively occupies the super memory block.

4. The memory system of claim 3, wherein the memory controller is configured to,
    when the sharing level of the first namespace is a second sharing level different from the first sharing level,
    perform control such that the first namespace shares the super memory block with the second namespace.

5. The memory system of claim 4, wherein the sharing level of the second namespace is the second sharing level.

6. The memory system of claim 4, wherein the memory controller is configured to set a maximum number of namespaces capable of sharing the super memory block depending on the second sharing level.

7. The memory system of claim 3, wherein the memory controller is configured to,
    when the sharing level of the first namespace is a second sharing level different from the first sharing level, and when there is no other namespace having the second sharing level among the N namespaces,
    perform control such that the first namespace exclusively occupies the super memory block.

8. A memory controller comprising:
    a memory interface configured to communicate with a memory device comprising a plurality of memory blocks;

a control circuit configured to control the memory device, wherein the control circuit is configured to:
    divide a data storage space of the memory device into N namespaces, where N is a natural number of 2 or more; and
    perform control such that a first namespace of the N namespaces shares a super memory block, which comprises some of the plurality of memory blocks, with a second namespace different from the first namespace, among the N namespaces, or exclusively occupies the super memory block based on a sharing level of the first namespace, wherein the sharing level of a namespace indicates whether the namespace exclusively occupies a specific super memory block or a number of other namespaces which share the specific super memory block with the namespace;
    determine the sharing level for the first namespace based on a ratio of a size of the first namespace to a total size of the data storage space of the memory device; and
    determine the sharing level for the second namespace based on a ratio of a size of the second namespace to the total size of the data storage space of the memory device,
    wherein data stored in the first namespace and data stored in the second namespace are stored together in the same super memory block, when the first namespace and the second namespace share the super memory block.

9. The memory controller of claim 8, wherein the control circuit is configured to,
    when the sharing level of the first namespace is a first sharing level,
    perform control such that the first namespace exclusively occupies the super memory block.

10. The memory controller of claim 9, wherein the control circuit is configured to,
    when the sharing level of the first namespace is a second sharing level different from the first sharing level,
    perform control such that the first namespace shares the super memory block with the second namespace.

11. The memory controller of claim 10, wherein the sharing level of the second namespace is the second sharing level.

12. The memory controller of claim 11, wherein the control circuit is configured to set a maximum number of namespaces capable of sharing the super memory block depending on the second sharing level.

13. The memory controller of claim 9, wherein the control circuit is configured to,
    when the sharing level of the first namespace is a second sharing level different from the first sharing level, and when there is no other namespace having the second sharing level among the N namespaces,
    perform control such that the first namespace exclusively occupies the super memory block.

14. An operation method of a memory controller for controlling a memory device comprising a plurality of memory blocks, the method comprising:
    dividing a data storage space of the memory device into N namespaces, where N is a natural number of 2 or more;
    performing control such that a first namespace of the N namespaces shares a super memory block, which comprises some of the plurality of memory blocks, with a second namespace different from the first namespace, among the N namespaces, or exclusively occupies the super memory block based on a sharing level of the first namespace, wherein the sharing level of a namespace indicates whether the namespace exclusively occupies a specific super memory block or a number of other namespaces which share the specific super memory block with the namespace;
    determining the sharing level for the first namespace based on a ratio of a size of the first namespace to a total size of the data storage space of the memory device; and
    determining the sharing level for the second namespace based on a ratio of a size of the second namespace to the total size of the data storage space of the memory device,
    wherein data stored in the first namespace and data stored in the second namespace are stored together in the same super memory block, when the first namespace and the second namespace share the super memory block.

* * * * *